No. 762,415. PATENTED JUNE 14, 1904.
A. A. HUTCHINSON.
HIDE WORKING MACHINE.
APPLICATION FILED JULY 11, 1903.
NO MODEL. 8 SHEETS—SHEET 1.

Witnesses:
Nathan C. Lombard 2nd
G H K Dailey

Inventor:
Albert A. Hutchinson,
by Walter E. Lombard,
Atty.

No. 762,415. PATENTED JUNE 14, 1904.
A. A. HUTCHINSON.
HIDE WORKING MACHINE.
APPLICATION FILED JULY 11, 1903.
NO MODEL. 8 SHEETS—SHEET 3.

Witnesses:
Nathan C. Lombard 2nd
G H E Dailey

Inventor:
Albert A. Hutchinson,
by Walter E. Lombard,
Atty.

No. 762,415. PATENTED JUNE 14, 1904.
A. A. HUTCHINSON.
HIDE WORKING MACHINE.
APPLICATION FILED JULY 11, 1903.
NO MODEL. 8 SHEETS—SHEET 4.

Witnesses:
Nathan C. Lombard 2nd
H. H. Dailey

Inventor:
Albert A. Hutchinson,
by Walter E. Lombard,
Atty.

No. 762,415. PATENTED JUNE 14, 1904.
A. A. HUTCHINSON.
HIDE WORKING MACHINE.
APPLICATION FILED JULY 11, 1903.
NO MODEL. 8 SHEETS—SHEET 7.

Witnesses:
Nathan C. Lombard 2nd.
H. C. Dailey

Inventor:
Albert A. Hutchinson,
by Walter E. Lombard,
Atty.

No. 762,415. PATENTED JUNE 14, 1904.
A. A. HUTCHINSON.
HIDE WORKING MACHINE.
APPLICATION FILED JULY 11, 1903.
NO MODEL. 8 SHEETS—SHEET 8.

Witnesses:
Edwin T. Luce
Thomas A. Long.

Inventor:
Albert A. Hutchinson,
by Walter E. Lombard
Atty.

No. 762,415.

Patented June 14, 1904.

UNITED STATES PATENT OFFICE.

ALBERT A. HUTCHINSON, OF WINCHESTER, MASSACHUSETTS.

HIDE-WORKING MACHINE.

SPECIFICATION forming part of Letters Patent No. 762,415, dated June 14, 1904.

Application filed July 11, 1903. Serial No. 165,103. (No model.)

*To all whom it may concern:*

Be it known that I, ALBERT A. HUTCHINSON, a citizen of the United States of America, and a resident of Winchester, in the county of Middlesex and State of Massachusetts, have invented certain new and useful Improvements in Hide-Working Machines, of which the following is a specification.

This invention relates to machines for removing the hair and superfluous flesh from hides, and has for its principal object the projection of a machine which may be adapted readily for either purpose with but very slight adjustment in the mechanism.

It consists in certain novel features of construction and arrangement of parts, which will be readily understood by reference to the description of the drawings and to the claims to be hereinafter given.

This invention is an improvement upon another invention of mine for which application for Letters Patent of the United States was filed November 3, 1902, Serial No. 129,974, and which was allowed May 11, 1903.

Figure 1:
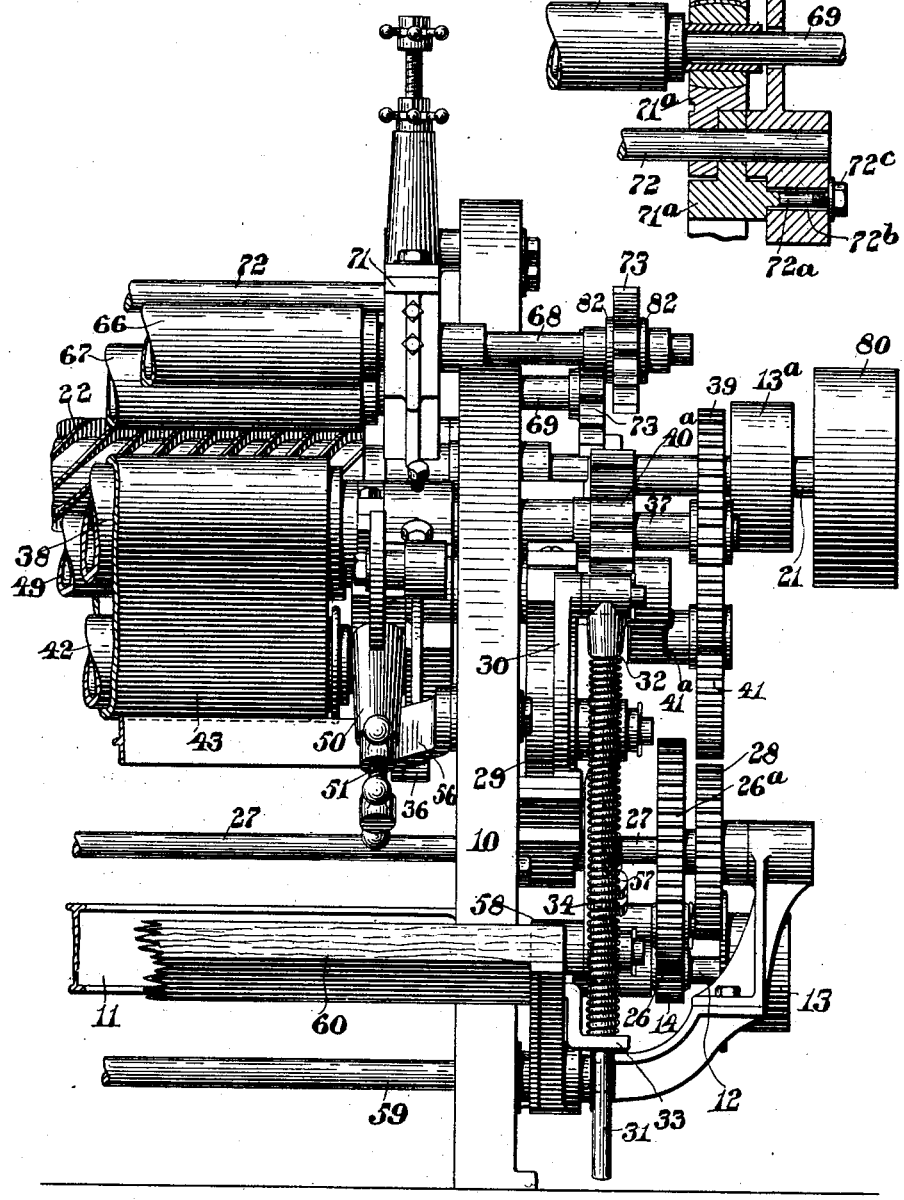
Figure 2:
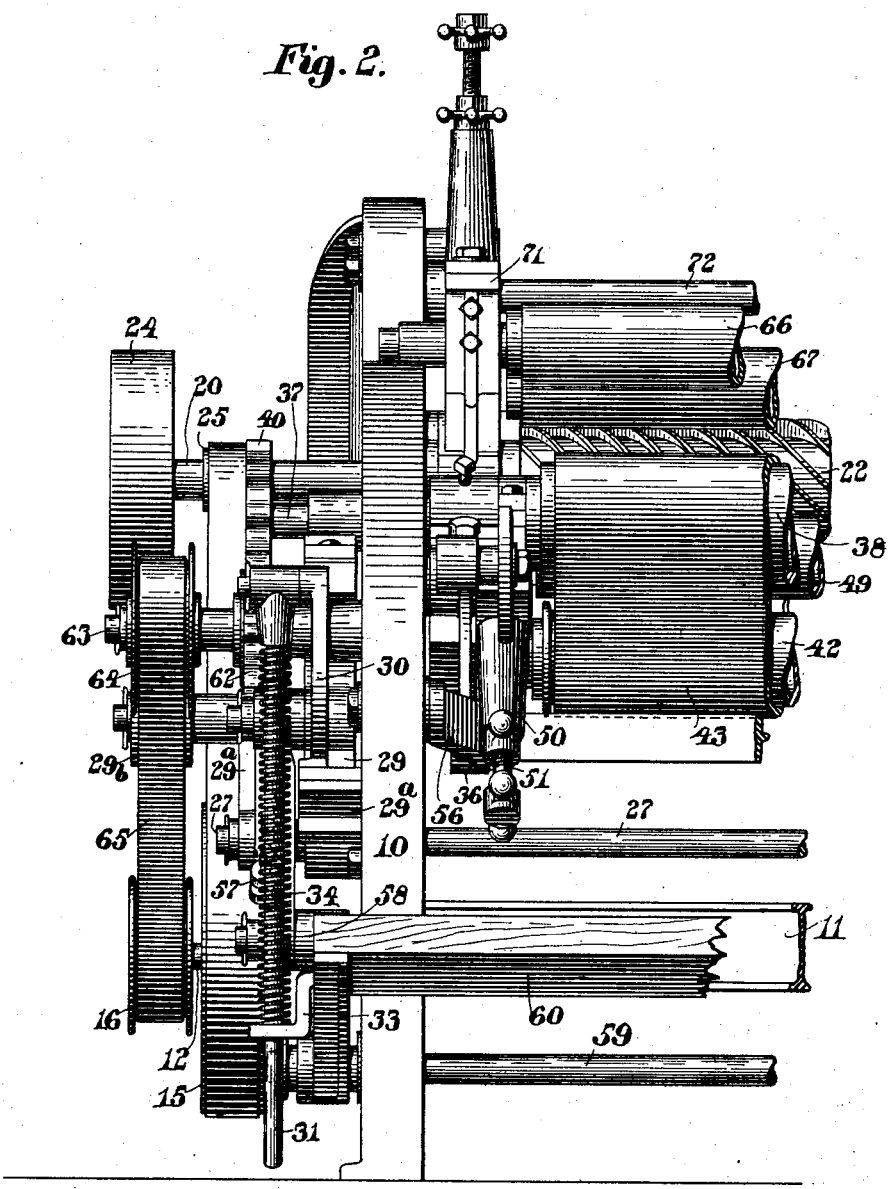
Figure 3:
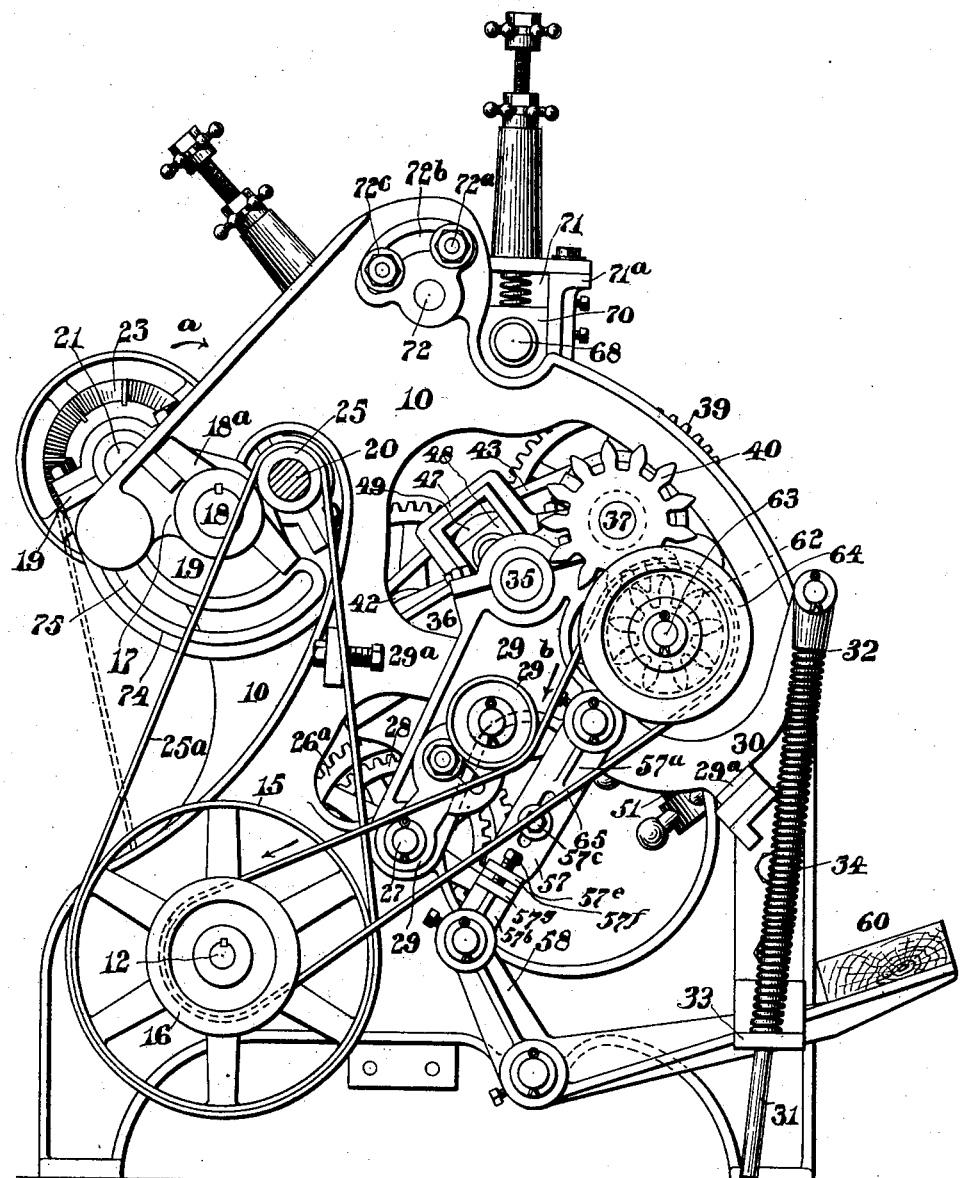
Figure 8:
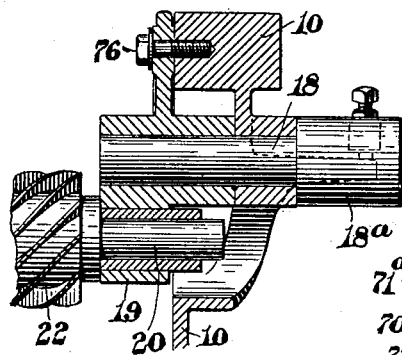
Figure 4:
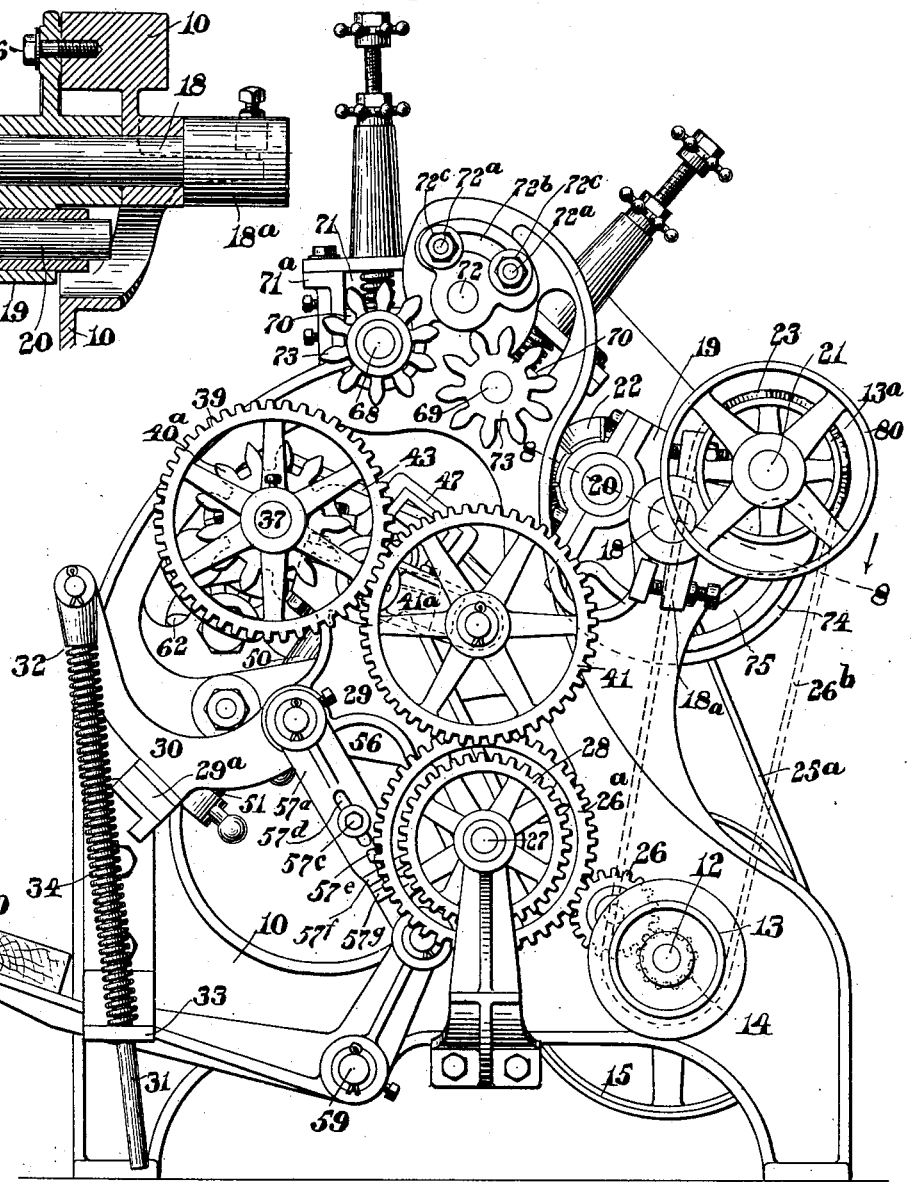
Figure 5:
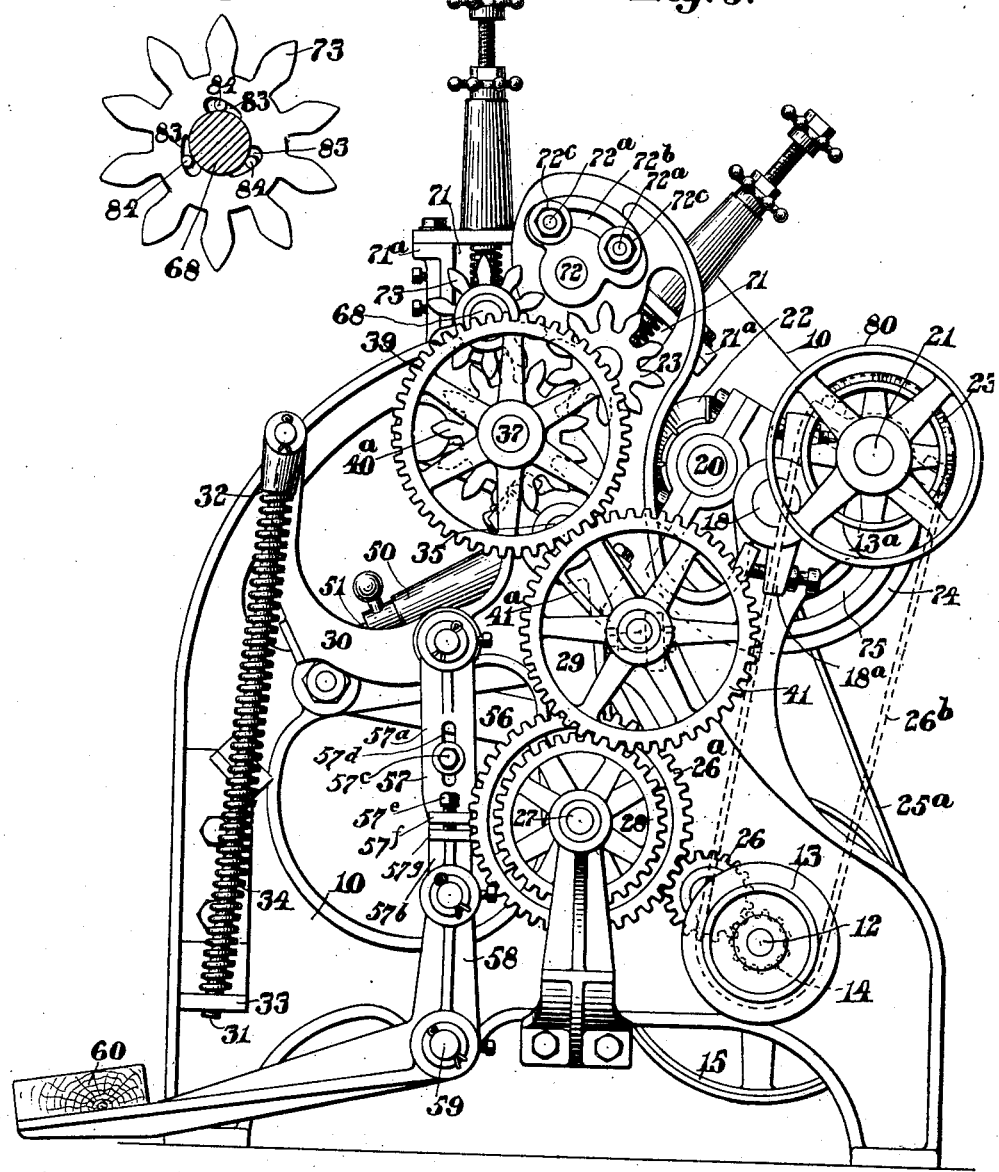
Figure 6:
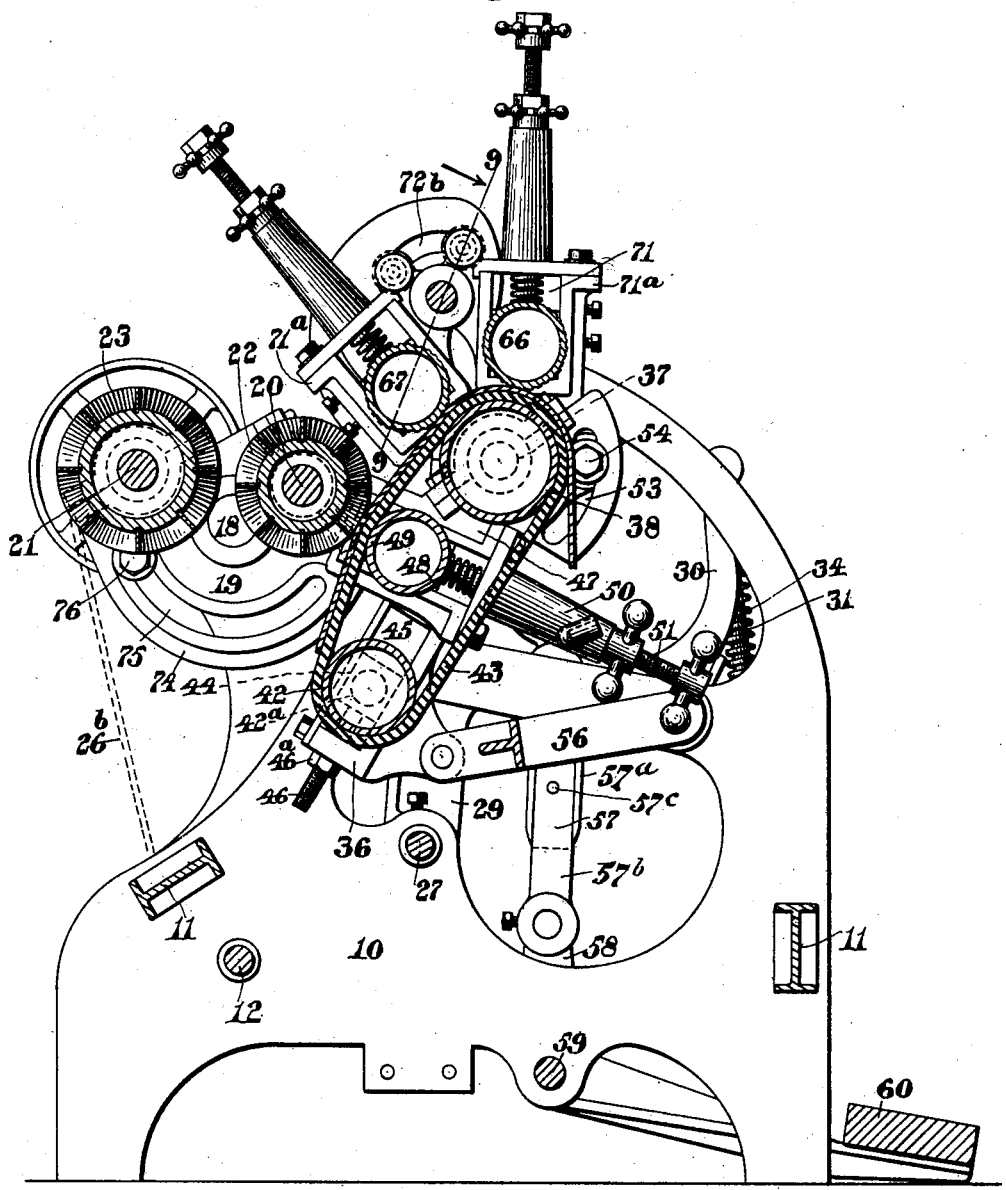
Figure 7:
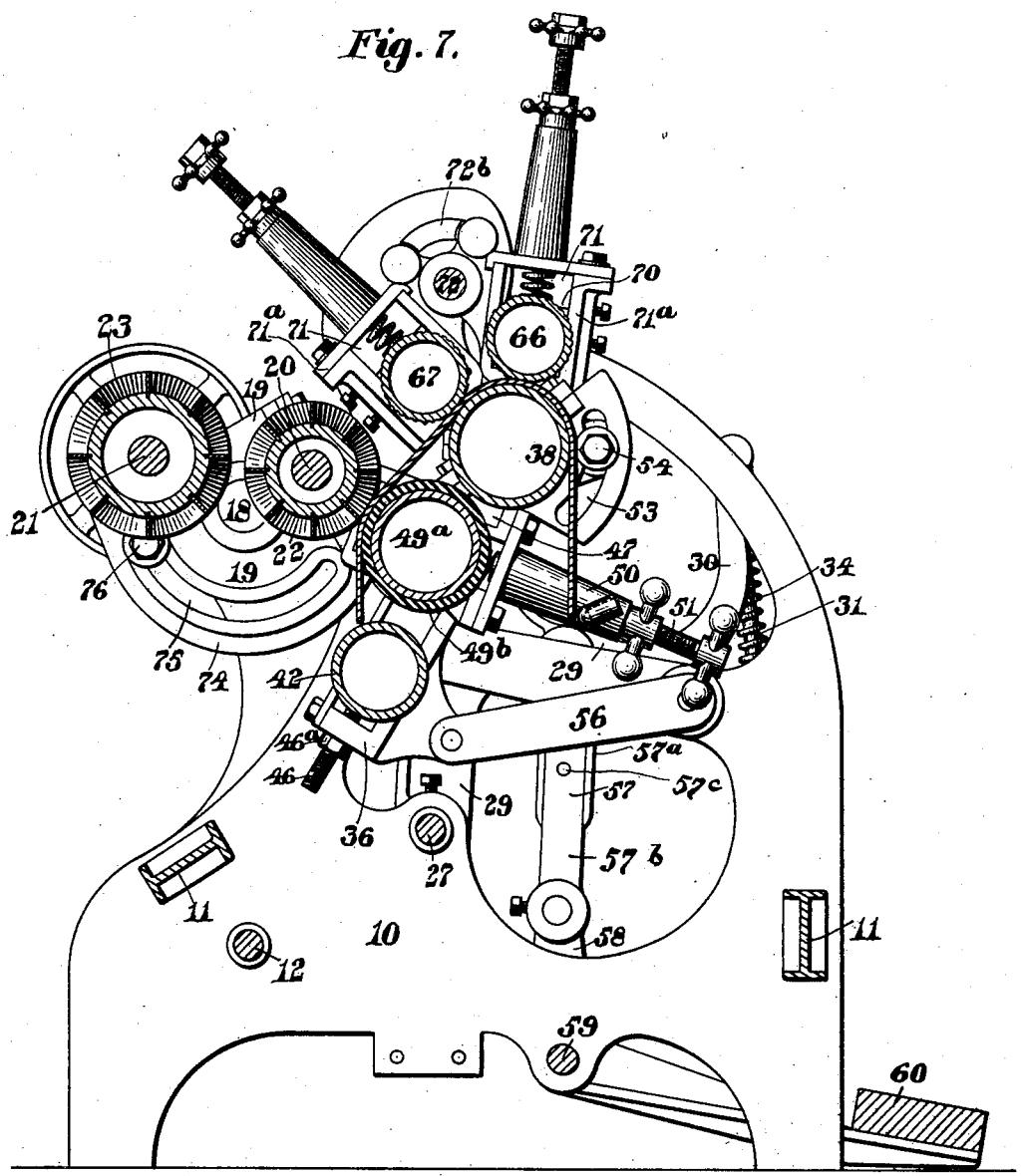
Figure 11:
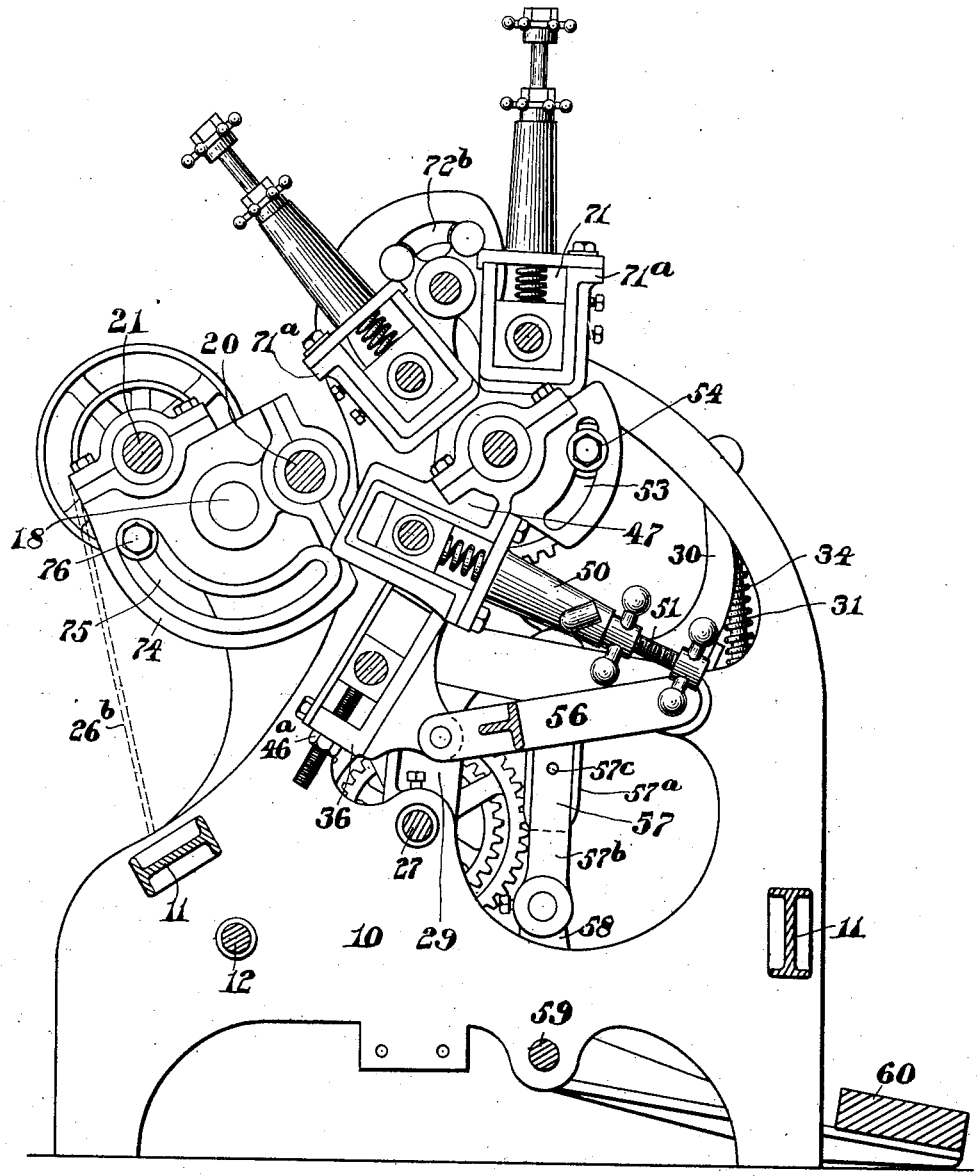

Of the drawings, Figure 1 represents a front elevation of the right-hand side of a machine embodying this invention. Fig. 2 represents a front elevation of the left end of same. Fig. 3 represents an end elevation of the left end of same. Fig. 4 represents an end elevation of the right end of same. Fig. 5 represents a similar view with the hide-supporting apron in position to coöperate with the knife-cylinder. Fig. 6 represents a vertical transverse section of same. Fig. 7 represents a similar view showing the apron removed and a rubber-covered roll substituted for the bed-roll used in connection with the apron. Fig. 8 represents a section on line 8 8 on Fig. 4. Fig. 9 represents a section on line 9 9 on Fig. 6. Fig. 10 represents a detail of the gear for operating one of the feed-rolls; and Fig. 11 represents a vertical transverse section of the machine near one of the end frames, showing the movable frames thereof and the parts associated therewith.

Similar characters designate like parts throughout the several figures of the drawings.

To support the working parts of the machine, a main frame is preferably provided made up of end frames 10 10 and tie-girths 11 11. In the frames 10 is mounted a shaft 12, having secured thereon at one end outside of said frames a small pulley 13 and a small pinion 14, while upon the other end thereof are mounted large and small pulleys 15 and 16. The rear of the frames 10 are provided with bearings 17 17 for trunnions 18 of the frame or side plates 19, which has mounted therein two shafts 20 21, each having secured thereon a knife-cylinder 22 and 23.

The knife-cylinder 22 on the shaft 20 is such as is ordinarily used for fleshing hides, while the knife-cylinder 23 on the shaft 21 is such as is commonly used for unhairing. The distance of the shaft 21 from the pivot 18 is slightly in excess of the distance of the shaft 20 from that pivot, while the knife-cylinder 23 is of greater diameter than the diameter of the knife-cylinder 22.

On the left-hand end of the shaft 20 are mounted two pulleys 24 25, the larger of which, 24, being belted by a belt to a counter-shaft, (not shown,) from which the fleshing-cylinder is driven at a high rate of speed. The smaller pulley 25 is connected by a belt $25^a$ to the pulley 15, which, with its shaft 12, is driven thereby. The pinion 14 on the shaft 12 meshes with an idler-gear 26, meshing with a gear $26^a$, loosely mounted on a shaft 27 and having secured thereto and turning therewith a gear 28.

On the shaft 27 are loosely mounted two rocker-arms 29, having arms 30 extending toward the front of the machine, to which are pivoted rods 31, provided with shoulders 32, between which and brackets 33, through which said rods pass, are interposed springs 34, tending to move said rocker-arms toward the rear of the machine. The holes in the brackets 33, through which said rods 31 pass, are of sufficient size and shape to permit the free movement of said rods therein as the rocker-frame 29 moves to and fro about its pivot. In bearings in said rocker-arms 29 are mounted the trunnion 35 of the side frames 36, in the front ends of which are mounted the trunnions 37, having secured thereto between said frames the apron-roll 38 and having also secured thereto outside of said frames 36 the gear 39 at the right-hand end and the gear 40 at the opposite end. The gear 39 meshes with a gear 41, mounted on an arm 41$^a$, secured to a trunnion 35, and is revolved thereby when the rocker-frame 29 is moved about its pivot to permit the hide to be operated upon, (which frame 29 is rigidly connected to said trunnion 35,) when the arm 41$^a$ will be moved about its axis to cause the gear 41 to mesh with the gear 28. The side frames 36 have also adjustably mounted therein a second apron-roll 42, upon which and the roll 38 is mounted an endless apron 43, of rubber or any other suitable material. The roll 42 is provided with trunnions 42$^a$, mounted in bearings in blocks 44, which may be adjusted in slots 45 by means of the screws 46 and nuts 46$^a$ to tighten the apron 43. Adjustable stops 29$^a$ are provided to limit the movement of said rocker-arms 29 in either direction.

On the trunnions 37 outside of the apron-rolls 38 are hung swinging arms 47, provided with boxes 48, in which is mounted a bed-roll 49, said boxes being provided with spring tension devices 50, which may be adjusted by means of the screws 51. The arms 47 are provided with slots 53 53, through which project clamping-bolts 54 in the side frames 36, thereby permitting the arms 47 to be moved about their pivot 37, whereby said bed-roll may be clamped in any desired position. This feature is an important part of this invention, for it readily provides a means whereby two knife-cylinders for two distinct purposes may be used in the same machine, inasmuch as when the bed-roll 49 is clamped in the position shown in Fig. 6 it provides a firm practically unyielding surface for the fleshing-knife cylinder to coöperate with, while when clamped in a position removed from the apron it permits the unhairing-knife cylinder to coöperate with the apron 43, which when unbacked by the bed-roll forms a very yielding surface, which is most desirable when the hide is being operated upon in this manner. The tension of the apron when the unhairing-cylinder is in operation may be varied by moving the bed-roll into contact with the lower portion thereof.

For some classes of work it is desirable to remove the apron from the rolls 38 42 and substitute for the bed-roll 49 a bed-roll 49$^a$ with a rubber periphery 49$^b$, which may readily be accomplished without altering any portion of the machine. The roll 49$^a$ coöperating with an uncovered metal roll 38 permits the hides to spread much better than on an apron, which it is often of great advantage to accomplish.

The side frames 36 are connected to the frame 10 by radius arms 56, which change the inclination of the apron as the rocker-frame 29 is moved to the rear about its pivot 27. This movement of the rocker-frame toward the rear of the machine is effected by the toggle 57 58, the upper member, 57, of which is a link pivoted to the arm 30 of the rocker-frame 29 and connected at the lower end to the lower member, 58, securely mounted upon the rocker-shaft 59. A treadle 60, also securely mounted upon the rocker-shaft, serves to straighten the toggle members 57 58 to move said rocker-frame 29 to the rear.

The link 57 is in two parts 57$^a$ and 57$^b$ and adjustably secured together by a bolt 57$^c$, secured to one part and passing through a slot 57$^d$ on the other part. By lengthening or shortening the link the movement of the rocker-frame 29 is regulated. This adjustment of the link 59 is effected by means of the adjusting-screw 57$^e$, threaded in an ear 57$^f$ on one part, 57$^a$, and bearing against another ear 57$^g$ on the other part, 57$^b$. When the operator's foot is removed from the treadle, the weight of the frames causes them to return to their normal position.

When the parts are in their normal positions and the hide is not being operated upon, as shown in Figs. 3 and 4, the gear 40 on the apron-roll shaft 37 meshes with the idler-gear 62, mounted on a stud 63 on the frame 10, said gear 62 being mounted upon the hub of the pulley 64, which is connected by a belt 65 to the small pulley 16 on the shaft 12 and is revolved thereby in the direction indicated by arrows on Fig. 3 of the drawings.

On the pivot of the rocker-frame 29 is mounted an arm 29*, provided with a roll 29$^b$, adapted to contact with the belt 65 when the hides are being fed to the machine. By this means the apron when it is in its normal position is moved in a direction to feed the hide into a position to be operated upon by the knife-cylinder.

In the upper portion of the frames 10 are mounted two grooved feed-rolls 66 and 67, said feed-rolls each being provided with trunnions 68 69, having bearings in boxes 70, movably mounted in slots 71 in frames 71$^a$ and each provided with a spring tension device of any well-known construction. The trunnions 68 69 have secured to their right-hand ends gears 73 73, which are adapted to mesh with the gear 40$^a$ on the apron-roll trunnion 37 when the hide is being operated upon and be revolved thereby, thus causing the feed-rolls 66 67 to coöperate with the apron 43 to feed the hide beneath the knife-cylinder.

The frames 71$^a$, in which the feed-rolls 66 67 are mounted, are each mounted upon a common shaft 72 and each have a stud 72$^a$, projecting through a slot 72$^b$ in the frame 10, said studs being provided with clamping-nuts 72$^c$, by which said feed-rolls may be clamped in any desired position. By this mechanism either or both rolls may be thrown out of operating position, which it is often desired to do.

The frames 19 are provided with flanges 74, provided with slots 75, through which extend clamping-screws 76, mounted in the frame 10, and by which the frames 19 may be held securely in the position shown in the drawings or in a similar position with the unhairing-cylinder in position to operate. On the trunnions 18, outside of the frame 10, are secured collars 18ᵃ, provided with radial arms to limit the movement of the frames or side plates 19 in either direction. These arms may be provided with adjustable stops 18ᵇ, as shown in Figs. 4 and 5, or these may be omitted, as shown in Fig. 3.

To bring the unhairing-cylinder 23 into position to operate upon the hide, the belt 25ᵃ is removed and the frame 19 moved about its trunnions in the direction of the arrow $a$ on Fig. 3 until the knife-cylinder 23 reaches the position in which the fleshing-cylinder 22 is shown in the drawings, when the frame 19 will be securely clamped and a belt 26ᵇ, which will be similarly placed upon the pulleys 13 and 13ᵃ on the right of the machine. The machine will then be in condition for unhairing.

While it is a very great advantage for the operator to have his hide-support inclined considerably when the hide is being operated upon, it is not convenient to have so much of an inclination of the hide-support when the hide is being fed into an operative position, as the operator desires to see every portion of the hide as it goes into place.

The shaft 21 has secured to its right end a pulley 80, which is belted to a counter-shaft (not shown) when the unhairing-cylinder is in operation, and on its hub is secured a pulley 13ᵃ, which at this time is belted to the pulley 13 on the shaft 12. The dimensions of the pulleys 13 and 13ᵃ are such as to revolve the unhairing-cylinder at a comparatively slow speed relative to the movement of the apron in comparison with the speed of the fleshing-cylinder. When the fleshing-cylinder is in operation, the pulleys 13 13ᵃ and 80 are free from belts.

The gear 73 is mounted loosely on the trunnion 68 between collars 82 and is provided with depressions 83, in which are rollers 84, which prevent the feed-roll 66 from being operated in the wrong direction and which permits the same to slightly accommodate itself in meshing with the gear 40ᵃ.

The operation of the machine is as follows: The parts being in their normal position, as shown in Fig. 3, the operator takes a hide and places it upon the apron 43, the hide-supporting surface of which is moving toward the rear of the machine at this time. The movement of the apron to the rear while the hide is held by the operator tends to "put out" the same and spread it flat upon the hide-support free from wrinkles. When the center of the hide has been fed somewhat beyond the knife-cylinder, the operator depresses the treadle 60 and nearly straightens the toggle 57 58, thereby moving the rocker-frame 29 about its pivot toward the rear of the machine, this movement causing the frames 36 to be moved about their trunnions 35 by means of the radius-arms 56 and assume the position shown in Figs. 5 and 6, with the apron 43, backed by the bed-roll 49, held firmly in contact with the knife-cylinder 22, and that portion of the apron 43 which is backed by the apron-roll 38 coöperating with the feed-rolls 66 67 to feed the hide outward. This direction of the movement of the apron 43 is effected by the meshing of the gear 41 with the gear 28 when the frames 29 36 are moved about their pivots, thereby causing the movement of the gear 28 to be imparted to the apron-roll 38 upon the shaft 37. The gear 40ᵃ on said shaft 37 is at the same time brought into mesh with the gears 73 73 on the trunnions 68 69, thereby causing the feed-rolls 66 67 to coöperate with said apron to feed the hide outward. The fleshing-cylinder 22 is revolved continuously at a high rate of speed by a belt from a counter-shaft, and the hide is held in yielding contact therewith, permitting inequalities and varying thicknesses of hide to be operated upon without undue injury thereto. When one half of the hide has been operated upon, the hide is reversed and the other half is placed in position to be acted upon by the knife-cylinder. When the operation has been accomplished, the operator removes his foot from the treadle, and the weight of the frames 29 36 being somewhat in excess of the lifting power of the springs 34 said frames fall back into their normal position by gravity.

If it is desired to unhair, the driving-belt and the belt 26ᵇ are removed, the unhairing knife-cylinder is moved into and secured in its operative position, the pulley 80 is belted to the counter-shaft, (not shown,) and the pulley 81 connected to the pulley 15 by a suitable belt. The bed-roll 47 is moved away from the apron 43 and clamped in its removed position and the machine is ready for unhairing.

When the hide is in soak and has the hair on, it is a great advantage to feed the hide without wrapping the same around the hide-supporting roll 38, and to accomplish this the feed-roll 66 is thrown out of contact therewith, and the feed-roll 67, being at right angles with a line drawn between the axis of said roll and the axis of the bed-roll, feeds the hide without wrapping the same around said roll, and therefore permits the hide to be spread much more readily than it otherwise would be, thereby preventing any cutting of the hide when it is fed between the bed-roll and knife-cylinder.

Having thus described my invention, I claim—

1. The combination with a hide-support, of a pivoted frame, a pair of knife-cylinders of different diameters mounted in said frame, and means whereby either of said knife-cylinders may be brought into operative position with said hide-support.

2. The combination with a hide-support, of a pivoted frame, a pair of knife-cylinders of different diameters mounted in said frame at different distances from said pivot, and means whereby either of said knife-cylinders may be brought into operative position with said hide-support.

3. The combination with a pair of separated rolls, of an apron mounted upon said rolls, a pivoted frame, a pair of knife-cylinders of different diameters mounted in said frame, and means whereby said frame may be moved about its pivot to bring either of said knife-cylinders into position to coöperate with said apron.

4. The combination with a pair of separated rolls, of an apron mounted upon said rolls, a pivoted frame, knife-cylinders of different diameters mounted in said frame at different distances from said pivot, and means whereby said frame may be moved about its pivot to bring either of said knife-cylinders into position to coöperate with said apron.

5. The combination with a hide-support, of a pivoted frame, a pair of knife-cylinders of different diameters mounted in said frame, means whereby either of said knife-cylinders may be brought into operative position with said hide-support, and means for revolving said cylinders at different speeds.

6. The combination with a pair of separated rolls, of an apron mounted upon said rolls, a pivoted frame, a pair of knife-cylinders of different diameters mounted in said frame, means whereby said frame may be moved about its pivot to bring either of said knife-cylinders into position to coöperate with said apron, and means for revolving said cylinders at different speeds.

7. The combination with a pair of separated rolls, of an apron mounted upon said rolls, a bed-roll located between said rolls beneath said apron, means for moving said bed-roll into and out of contact with said apron, a pivoted frame, a pair of knife-cylinders of different diameters, and means whereby either of said cylinders may be moved into position to coöperate with said bed-roll or apron.

8. The combination with a hide-support, of a pair of pivoted side plates, a pair of knife-cylinders mounted in bearings in said side plates, a curved slot in one of said side plates, and a device coöperating with said slot whereby either of said cylinders may be clamped in operating position.

9. The combination with a hide-support, of a pivoted frame, a pair of knife-cylinders mounted in said frame, means for clamping said frame, and radial arms secured to the pivots of said frame to serve as stops and limit the movement thereof in either direction.

10. The combination with a hide-support, of a pair of pivoted side plates, a pair of knife-cylinders mounted therein, a slot in one of said side plates, and a bolt coöperating with said slot and adapted to clamp said pivoted side plates to the framework.

11. The combination with a hide-support, of a pivoted frame, a pair of knife-cylinders mounted in said frame, means for clamping said frame, radial arms secured to the pivots of said frame, and adjustable stops mounted in said arms to limit the movement thereof in either direction.

12. The combination with a hide-support, of a pivoted frame, a pair of knife-cylinders mounted in said frame, a curved slot in said frame, a device coöperating with said slot whereby either of said cylinders may be clamped in operating position, and adjustable stops secured to the pivots of said frame to limit the movement thereof in either direction.

13. The combination with a knife-cylinder, of a pivoted rocker-frame, a pair of apron-rolls on said frame, a driving-pulley, an idler-pulley, a belt connecting said pulleys, an idler-gear revolving with said idler-pulley, means for moving said frame about its pivot to cause said hide-supporting apron to coöperate with said knife-cylinder, a gear mounted on the shaft of one of said apron-rolls and adapted to coöperate with said idler-gear when said apron is in non-operating position, and a roll adjustably mounted on said pivoted rocker-frame adapted to engage with said belt to cause the same to be operated by said driving-pulley when said hide-supporting apron is in its non-operating position.

14. The combination with a knife-cylinder, of a pivoted rocker-frame, a secondary frame pivoted to said rocker-frame, a pair of apron-rolls mounted in said secondary frame, an apron mounted on said rolls, means for moving said frames about their pivots to cause said hide-supporting apron to coöperate with said knife-cylinder, a gear for revolving one of said apron-rolls, a continuously-revolving driving-gear, and an idler-gear meshing with said apron-roll gear and adapted to mesh with said driving-gear when said apron is in coöperative position.

15. The combination with a knife-cylinder, of a pivoted rocker-frame, a pair of apron-rolls on said frame, a driving-pulley, an idler-pulley, a belt connecting said pulleys, an idler-gear revolving with said idler-pulley, means for moving said frame about its pivot to cause said hide-supporting apron to coöperate with said knife-cylinder, a gear mounted on the shaft of one of said apron-rolls and adapted to coöperate with said idler-gear when said apron is in non-operating position, and means secured to said rocker-frame and adapted to tighten said belt to drive said idler-pulley when said hide-supporting apron is in its non-operating position.

16. The combination with a knife-cylinder, of a pivoted rocker-frame, a pair of apron-rolls on said frame, a driving-pulley, an idler-pulley, a belt connecting said pulleys, an idler-gear revolving with said idler-pulley, means for moving said frame about its pivot to cause said hide-supporting apron to coöperate with said knife-cylinder, a gear mounted on the shaft of one of said apron-rolls and adapted to coöperate with said idler-gear when said apron is in non-operating position, and adjustable means secured to said rocker-frame and adapted to tighten said belt to drive said idler-pulley when said hide-supporting apron is in its non-operating position.

17. The combination with a knife-cylinder, of a pivoted rocker-frame, a secondary frame pivoted to said rocker-frame, a pair of apron-rolls mounted in said secondary frame, an apron mounted on said rolls, means for moving said frames about their pivots to cause said hide-supporting apron to coöperate with said knife-cylinder, a gear for revolving one of said apron-rolls, a continuously-revolving driving-gear, a rocking shaft, an arm secured to said rocking shaft, an idler-gear mounted on the stud in the free end of said arm, and means whereby said shaft is rocked to bring said idler-gear into mesh with said driving-gear.

18. The combination with a knife-cylinder, of a pivoted rocker-frame, a secondary frame pivoted to said rocker-frame, a pair of apron-rolls mounted in said secondary frame, an apron mounted on said rolls, means for moving said frames about their pivots to cause said hide-supporting apron to coöperate with said knife-cylinder, a gear for revolving said apron-rolls, a continuously-revolving driving-gear, a rocking shaft, an arm secured to said rocking shaft, an idler-gear mounted on the stud in the free end of said arm, and means whereby said shaft is rocked to bring said idler-gear into mesh with said driving-gear when said pivoted rocker-frame is moved into position for said apron to coöperate with said knife-cylinder.

19. The combination with a knife-cylinder, of a pivoted rocker-frame, a pair of apron-rolls mounted in said frame, an apron mounted on said rolls, means for moving said frame about its pivot to cause said hide-supporting apron to coöperate with said knife-cylinder, a gear for revolving one of said apron-rolls, a continuously-revolving gear, and means interposed between said gears whereby said gears are interconnected when said apron is in position to coöperate with the knife-cylinder.

20. The combination with a knife-cylinder, of a pivoted rocker-frame, a pair of apron-rolls mounted in said frame, an apron mounted on said rolls, means for moving said frame about its pivot to cause said hide-supporting apron to coöperate with said knife-cylinder, a gear for revolving one of said apron-rolls, gearing mounted on said rocker-frame for driving said apron-roll gear, a continuously-revolving gear, and means whereby said gearing and continuously-revolving gear will be brought into mesh when said rocker-frame is brought into position for said apron to coöperate with said knife-cylinder.

21. The combination with a knife-cylinder, of a pivoted rocker-frame, a pair of apron-rolls mounted on said frame, a driving-pulley, an idler-pulley, a belt connecting said pulleys, an idler-gear revolving with said idler-pulley, means for moving said frame about its pivot to cause said hide-supporting apron to coöperate with said knife-cylinder, a gear mounted on the shaft of one of the apron-rolls and adapted to coöperate with said idler-gear when said apron is in non-operating position, and a roll mounted on said pivoted rocker-frame adapted to engage with said belt to cause the same to be operated by said driving-pulley when said hide-supporting apron is in its non-operating position.

22. The combination with a knife-cylinder, of a hide-support, a feed-roll, a gear for revolving said feed-roll, clutch members interposed between said feed-roll and its gear, a gear to coact with said feed-roll gear, means for moving said gears into mesh, and means for revolving said gears when in mesh.

23. The combination with a knife-cylinder, of a hide-support, a feed-roll, a gear for revolving said feed-roll, clutch members interposed between said feed-roll and its gear, and a gear to coact with said feed-roll gear.

24. The combination with a knife-cylinder, of a hide-support, means for moving said hide-support into position to coöperate with said knife-cylinder, gearing for operating said hide-support, a feed-roll, a gear secured to and revoluble with said feed-roll, an idler-gear adapted to mesh with the hide-supporting gearing when said hide-support is in its normal position, means for continuously revolving said gear, means for moving said hide-supporting gearing from mesh with said idler-gear into mesh with the feed-roll gear, and means for revolving said gear for said hide-support when the hide is being operated upon.

25. The combination with a knife-cylinder, of a hide-support, a feed-roll, means for revolving said feed-roll, and means for swinging said feed-roll from coöperative position.

26. The combination with a knife-cylinder, of a hide-support, a feed-roll, means for revolving said feed-roll, and means for locking said feed-roll in either its operating or non-operating position.

27. The combination with a knife-cylinder, of a hide-support, two feed-rolls, arms supporting said feed-rolls and mounted on a common pivot, and means whereby either or both of said feed-rolls may be clamped in positions to coöperate or not to coöperate with said hide-support.

28. The combination with a knife-cylinder, of a hide-support, two feed-rolls, means for revolving said feed-rolls, arms for supporting said feed-rolls, a common pivot upon which said arms are mounted, and clamping means for each of said arms whereby its feed-roll may be secured in operating or non-operating position.

29. The combination with a knife-cylinder, of a hide-support, two feed-rolls, means for revolving said feed-rolls, arms for supporting said feed-rolls, a pivot common to both of said arms, a bolt mounted on each of said arms and extending through a slot in the framework, and a clamping-nut for clamping said arms in adjusted position.

30. The combination with a knife-cylinder, of a hide-support, two feed-rolls, and means whereby either or both of said feed-rolls may be brought into position to coöperate with said hide-support.

31. The combination with a knife-cylinder, of an apron-roll in front of said knife-cylinder, a bed-roll, an apron mounted upon said rolls, and a single feed-roll contacting with said apron at a point where the hide first contacts with said apron.

32. The combination with a knife-cylinder, of an apron-roll in front of said knife-cylinder, a bed-roll, an apron mounted upon said rolls, and a single feed-roll contacting with said apron at right angles to a line connecting the centers of said apron-roll and bed-roll.

Signed by me at Boston, Massachusetts, this 27th day of June, 1903.

ALBERT A. HUTCHINSON.

Witnesses:
WALTER E. LOMBARD,
EDNA C. CLEVELAND.